United States Patent [19]
Park

[11] Patent Number: 6,005,831
[45] Date of Patent: Dec. 21, 1999

[54] ROULETTE-TYPE DISK CHANGER

[75] Inventor: Dong-Kyun Park, Seoul, Rep. of Korea

[73] Assignee: Daewoo Electronics Co., Ltd, Rep. of Korea

[21] Appl. No.: 08/969,336

[22] Filed: Nov. 28, 1997

[30]    Foreign Application Priority Data

Nov. 28, 1996  [KR]  Rep. of Korea ...................... 96-43067
Nov. 28, 1996  [KR]  Rep. of Korea ...................... 96-59081

[51] Int. Cl.⁶ .................................................. G11B 17/22
[52] U.S. Cl. .............................................................. 369/37
[58] Field of Search .................................. 369/33, 39, 37, 369/38, 75.1, 75.2, 191, 192, 194, 292; 360/98.04, 98.05, 98.06, 99.06, 99.02

[56]            References Cited

U.S. PATENT DOCUMENTS

| | | | |
|---|---|---|---|
| 5,115,419 | 5/1992 | Akiyama et al. | 369/37 |
| 5,193,079 | 3/1993 | Ko et al. | 369/37 |
| 5,270,989 | 12/1993 | Kimura | 369/37 |
| 5,293,362 | 3/1994 | Sakurai et al. | 369/30 |
| 5,513,157 | 4/1996 | Saito et al. | 369/34 |
| 5,631,884 | 5/1997 | Chun | 369/37 |
| 5,771,213 | 6/1998 | Koshino et al. | 369/37 |
| 5,777,957 | 7/1998 | Lyman | 369/37 |

FOREIGN PATENT DOCUMENTS

| | | |
|---|---|---|
| 0639832 | 2/1995 | European Pat. Off. . |
| 4121297 | 1/1992 | Germany . |
| 63-061461 | 3/1988 | Japan . |
| 08212662 | 8/1996 | Japan . |
| 2276755 | 10/1994 | United Kingdom . |

*Primary Examiner*—David L. Ometz
*Assistant Examiner*—Angel Castno
*Attorney, Agent, or Firm*—Anderson Kill & Olick

[57]               ABSTRACT

A disk changer includes a round roulette having three receiving planes, three sets of identification throughholes for detecting an identification number of the receiving plane and three sets of start/stop throughholes, therein each of the receiving planes has an elongated hole, a holder chuck, a light source, attached to a bottom surface of the holder chuck, for generating a light beam, a tray for supporting the round roulette and a photo sensor, mounted on top of the tray, for detecting the light beam. In the disk changer, the three sets of identification throughholes and the three sets of start/stop throughholes in the round roulette are formed on the circle path which intersects the centers of the center holes, thereby allowing the disk changer to detect both of the identification signal and the disk loading detection signal by using a photo sensor.

11 Claims, 5 Drawing Sheets

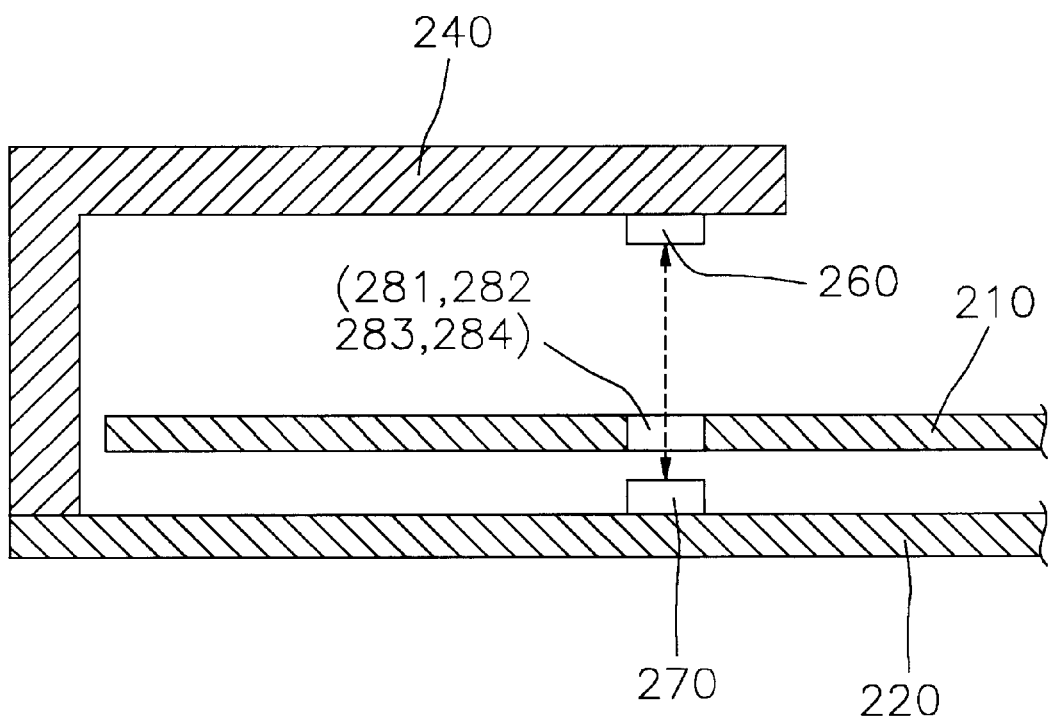

ROULETTE-TYPE DISK CHANGER

FIELD OF THE INVENTION

The present invention relates to a disk changer; and, more particularly, to an improved roulette-type disk changer capable of sensing both of a disk number and a disk loading detection signal by using a photo sensor.

DESCRIPTION OF THE PRIOR ART

As is well known, main difficulties associated with a compact disk player for reproducing a single disk, e.g., a digital audio disk or a compact disk, are caused due to the shortage of information recording area of the single disk. Therefore, in some applications such as a motion picture film, the amount of data, e.g., a whole volume of data of the motion picture film, is too large to be stored on a single disk and the data has to be divided to be recorded onto several disks. A roulette-type disk changer employed to load a plurality of disks on a round roulette incorporated therein for reproducing the data off the plurality of disks sequentially or selectively in response to a user's instructions has been introduced to solve the problem.

In FIGS. 1 and 2, there is shown a prior art roulette-type disk changer 100 capable of loading three disks at a time, as disclosed in U.S. Pat. No. 5,631,884, entitled "COMPACT-DISC CHANGER USING THE SAME OPTICAL PICKUP DEVICE USED FOR PLAYING DISC FOR SENSING ROULETTE POSITION", which is incorporated herein by reference. The disk changer 100 includes a tray 164, an L-shaped holder chuck 160 having a fixing member 168 and a horizontal member 162, a reflection plate 190 formed on bottom of the horizontal member 162, a round roulette 140 having throughhole groups for loading a plurality of disks, and a pickup portion 170 having a deck 178, a turn table 174, a motor 176, a sensor switch 172 and an optical pickup 171 for generating a laser beam.

In the disk changer 100, when the round roulette 140 rotates, the deck 178 descends vertically while the optical pickup 171 moves toward the outer circumference of the deck 178 to align with a throughhole 166 of the tray 164. When the optical pickup 171 reaches the proper position, the sensor switch 172 sends a detection signal to a control unit (not shown) which stops the movement of the optical pickup 171 and sets the laser beam focusing lens installed therein to a neutral position so that the emitted laser beam can be used for detecting the throughhole groups 121 to 123 and 110.

In this case, whenever a throughhole in the throughhole groups 121 to 123 and 110 of the round roulette 140 is aligned with the throughhole 166 in the tray 164, the emitted laser beam travels to the reflection plate 190 by passing through the throughhole 166 in the tray 164 and the throughhole groups 121 to 123 and 110 of the round roulette 140 and is interrupted by portions of the round roulette 140 which do not belong to the throughhole groups 121 to 123 and 110. And then, the reflected laser beam from the reflection plate 190 impinges onto a sensor (not shown) incorporated in the optical pickup 171 for creating a pulse signal which can be decoded. Accordingly, the respective disk number is determined.

In a similar manner, the pulse signal can determine the exact position for stopping the round roulette 140. Here, the passage and interruption of the laser beam determined by the formation of the roulette-stop-sensing throughholes 110 at predetermined locations around the round roulette 140 signify proper roulette stopping positions. Once the round roulette 140 is stopped at an exact position, the deck 178 ascends vertically and the optical pickup 171 is moved back in order to execute a normal operation for disk playback.

One of the major shortcomings of the above-described disk changer 100 is that it cannot detect whether or not a disk is loaded on the round roulette 140.

SUMMARY OF THE INVENTION

It is, therefore, a primary object of the present invention to provide a disk changer capable of sensing a disk number and a loading detection signal by using one photo sensor.

In accordance with the present invention, there is provide a disk changer comprising: a tray; a rotatable roulette mounted on the tray and provided with N number of receiving planes for loading the corresponding number of disks thereon, each of the receiving planes having an elongated hole and an identification number and each of the disks including a center hole, wherein N number of throughhole sets formed in a predetermined pattern along a circle path through the center holes for sensing the identification number and a stop position of the roulette, and the elongated holes and the center holes are utilized for sensing a loading detection signal, N is a positive integer; a light source positioned above the roulette for generating a light beam; and a photo sensor mounted on the tray below the roulette, wherein the photo sensor detects the change of the light beam emitted from the light source while the roulette rotates, thereby allowing the identification number, the disk stopping position or the loading detection signal to be sensed by the photo sensor.

BRIEF DESCRIPTION OF THE DRAWINGS

The present invention together with the above and other objects and advantages will become apparent from the following description of preferred embodiments, when read in conjunction with the accompanying drawings, wherein:

FIG. 4 depicts a schematic cross-sectional view of the a disk changer utilizing the inventive round roulette taken along the line V—V shown in FIG. 3.

DETAILED DESCRIPTION OF THE PREFERRED EMBODIMENTS

Figure 1:
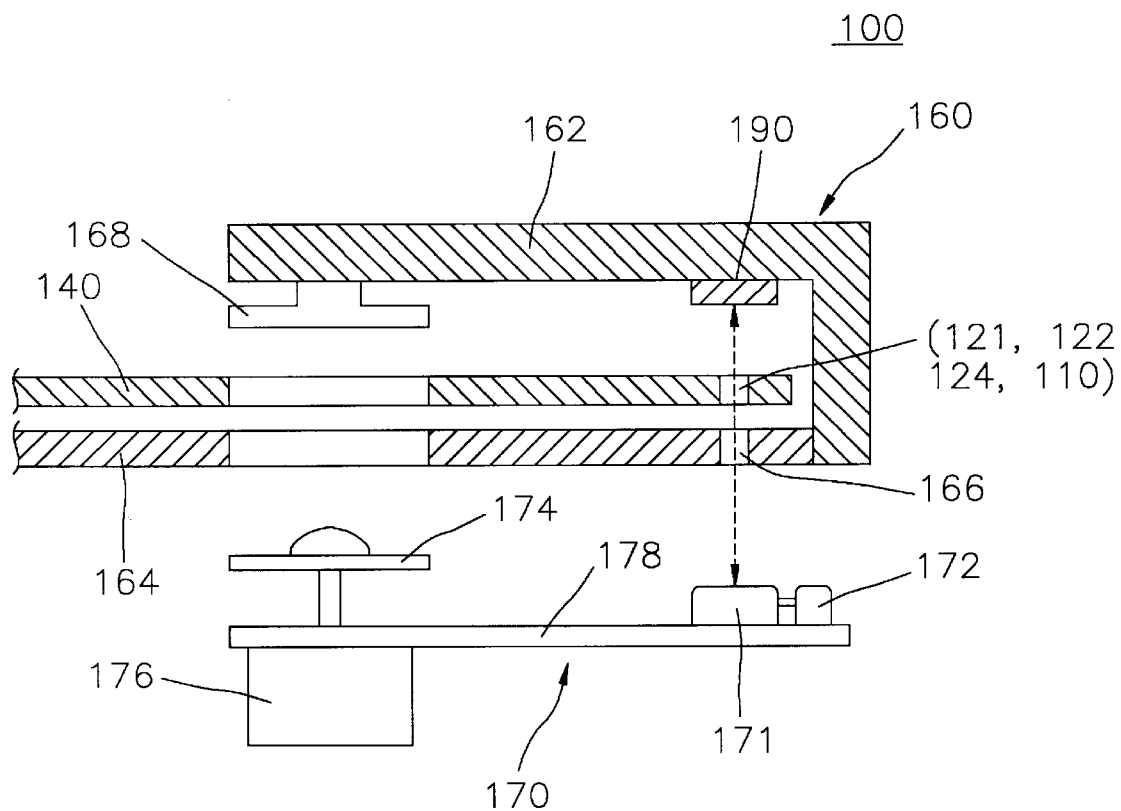
FIG. 1 represents a schematic cross-sectional view of a prior art roulette-type disk changer.
Figure 2:
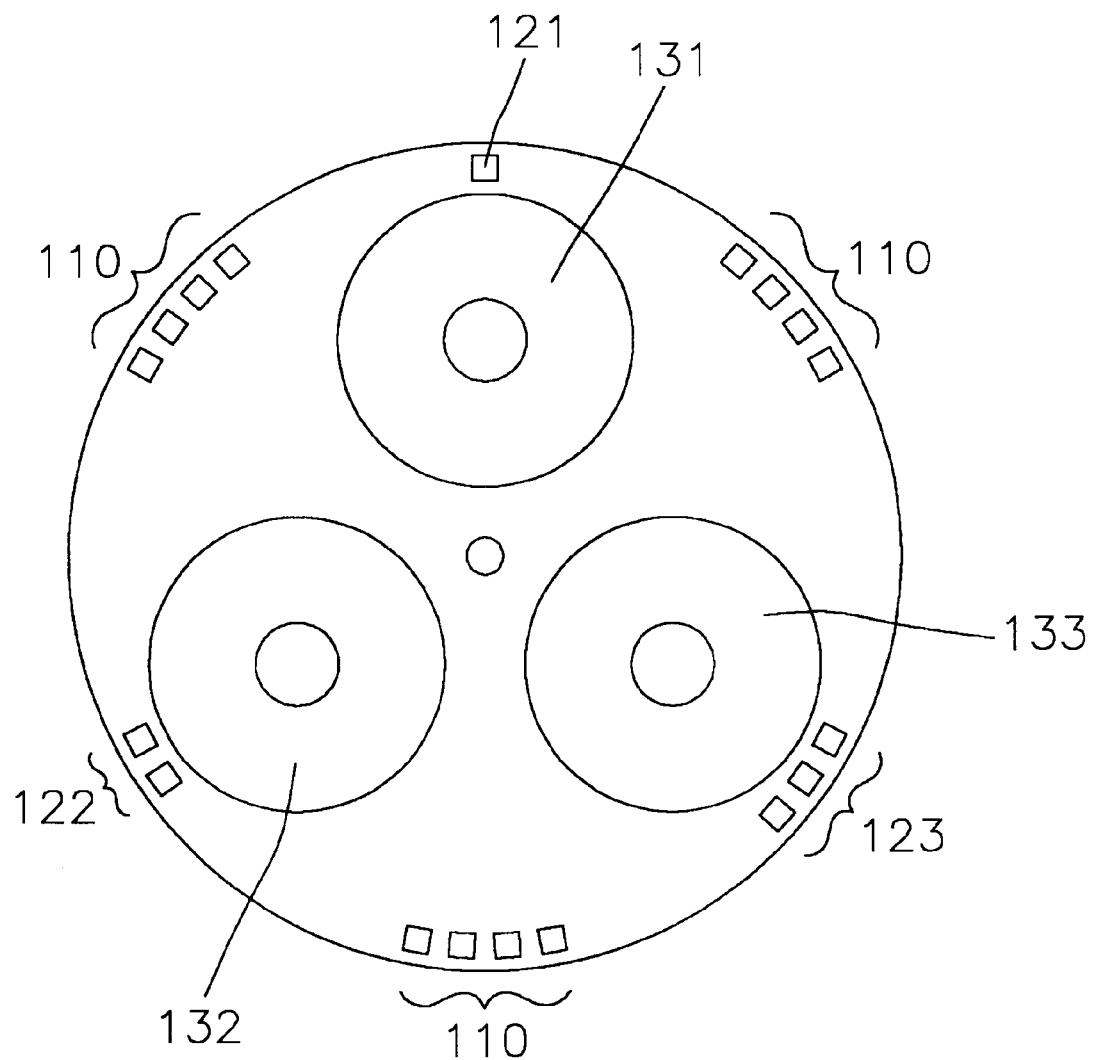
FIG. 2 is a plan view of a round roulette in the roulette-type disk changer shown in FIG. 1.
Figure 3:
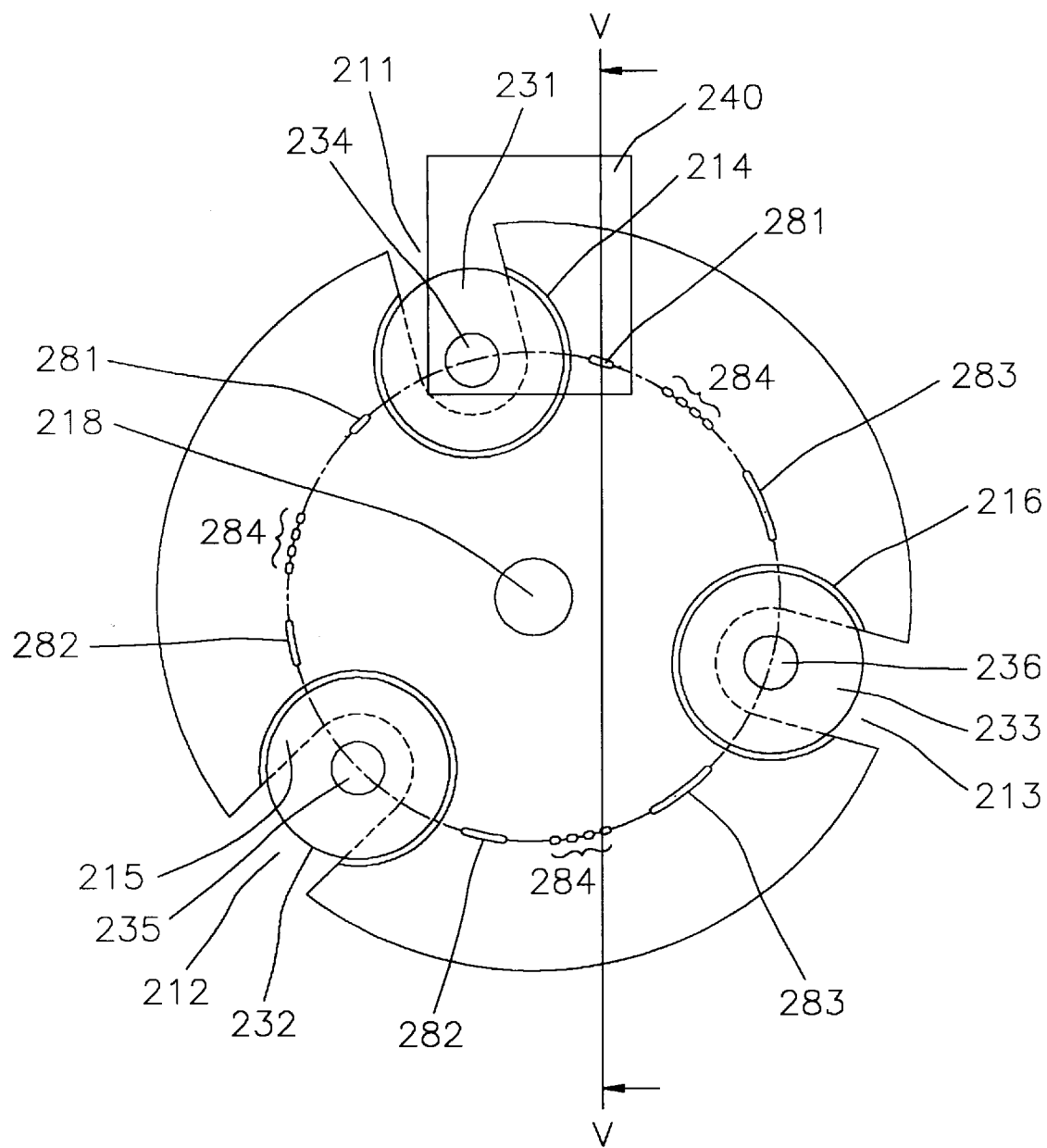
FIG. 3 shows a plan view of a round roulette in accordance with the present invention.

There are illustrated in FIGS. 3 to 5 various views of the inventive disk changer in accordance with a preferred embodiment of the present invention.

There is illustrated in FIG. 3 a plan view of an inventive round roulette 210 for use in a disk changer 200, capable of loading three disks 231 to 233 thereon, wherein each of the disks 231 and 233 has a center hole 234 to 236, respectively. The round roulette 210 installed on a rotary shaft 218 comprises three receiving planes 214 to 216, assigning an identification number to each of the receiving planes 214 to 216, three sets 281 to 283 of identification throughholes for detecting the identification number and three sets 284 of start/stop throughholes for use in controlling the start and halt of the round roulette 210, wherein each start/stop throughhole sets 284 is equally spaced from each other, each being located between the identification throughhole sets 281 to 283. Each of the receiving planes 214 to 216 to hold the disks 231 to 233 thereon, respectively, has an elongated hole for allowing an optical pickup(not shown) to scan through the recording area of the disks 231 to 233 during disk playback. The throughholes in the identification througthhole sets 281 to 283 and the start/stop throughhole sets 284 are formed in a predetermined pattern along a circular path passing through the center holes 234 to 236 for sensing the identification number and a stop position of the round roulette 210, wherein the elongated holes 211 to 213 and the center holes 234 to 236 of the disks 231 to 233 are used for generating a disk loading detection signal(DLDS), shown in FIGS. 5A to 5C. The width of the elongated hole is larger than a diameter of the center hole of the disk, thereby allowing a photo sensor 270, shown in FIG. 4, to generate the DLDS. It is preferable that the circular path passes through centers of the center holes 234 to 236 of the disks 231 to 233, wherein the circular path is indicated by one dashed-dot line. Each of the throughholes in the identification throughhole sets 281 to 283 and the start/stop throughhole sets 284 extends from an upper surface to a lower surface of the round roulette 210.

In the preferred embodiment of the present invention, the length of the throughhole in the second identification throughhole set 282 is equal to two times that of the first identification throughhole set 281 and the length of the throughhole of the third identification throughhole set 283 is identical to three times that of the first identification throughhole set 281. And, the throughholes in the start/stop throughhole set 284 are smaller than those of the identification throughhole sets 281 to 283. Since each of the identification throughhole sets 281 to 283 has a pair of throughholes and the throughholes in the circular path are formed symmetrically, the direction, e.g., clockwise or counterclockwise, of the round roulette 210 makes no difference for controlling the position of the round roulette 210.

As shown in FIG. 4, the disk changer 200 incorporating the inventive round roulette 210 includes an L-shaped holder chuck 204, a light source 260, attached to a bottom surface of the L-shaped holder chuck 240, for generating a light beam, a tray 220 for supporting the round roulette 210 and the photo sensor 270, mounted on top of the tray 220, for detecting the light beam.

In the disk changer 200, if a certain switch(not shown) is pressed for selecting a specific disk, an identification throughhole set corresponding to the specific disk, among the three identification throughhole sets 281 to 283, is detected by scanning the identification throughhole sets 281 to 283 and the start/stop throughhole sets 284 on the circular path using the light beam and the photo sensor 270. Thereafter, the receiving portion 214 loaded with the specific disk is stopped at a position of the optical pickup in response to a stopping signal generated in cooperation with the start/stop throughhole sets 284 and the photo sensor 270. In the preferred embodiment, the position of the light source 260 may be interchanged with that of the photo sensor 270. Further, if a reflection plate, being reflective for the light beam, is formed at the position of the light source 260, the light source 260 may be formed around the position of the photo sensor 270.

Figures 5A, 5B, 5C:
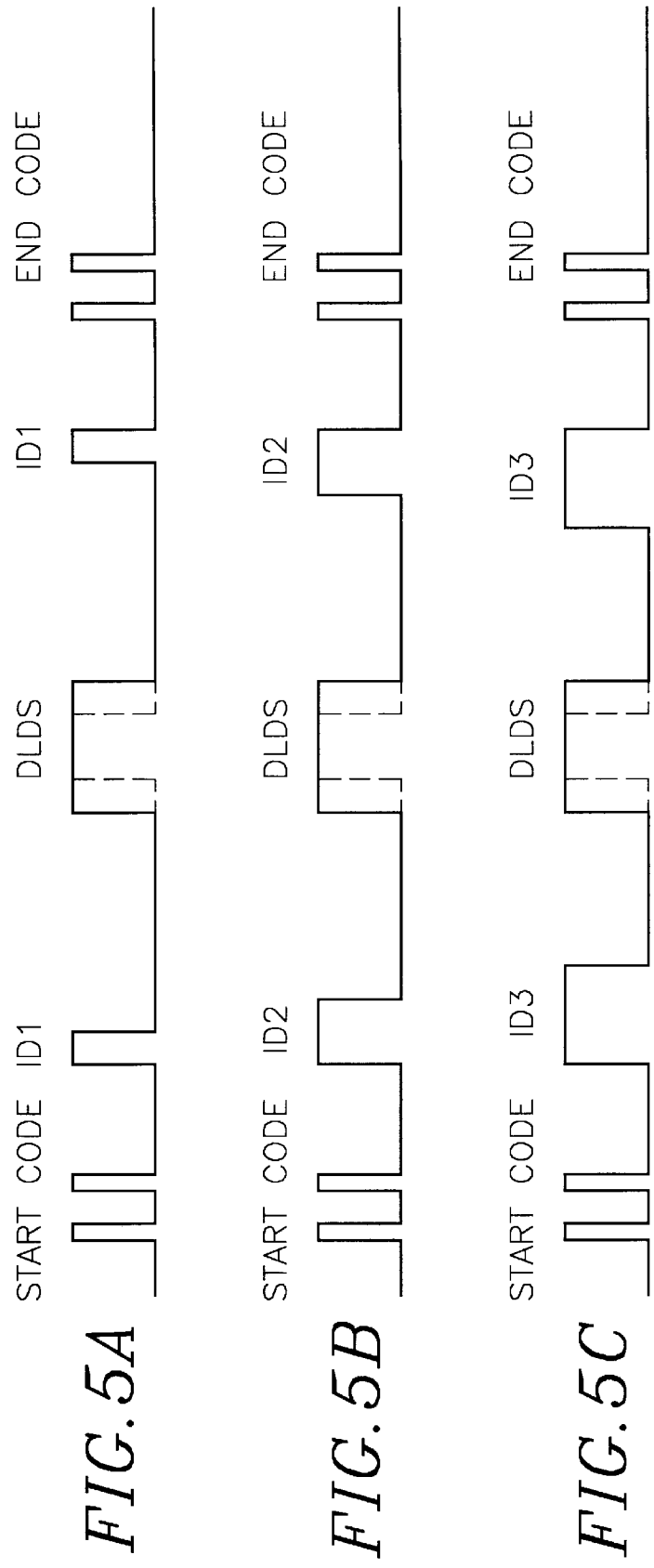
FIGS. 5A to 5C are the waveforms of the codes generated by the photo sensor shown in FIG. 4.

As shown in FIGS. 5A to 5C, when the round roulette 210 rotates, if the light beam scans through the receiving plane 214 onto which a first disk 231 is to be loaded, the photo sensor 270 generates a first pulse signal shown in FIG. 5A. The pulse signal includes a start and an end codes, two first identification signals(ID1) and a DLDS. in this case, if the first disk 231 is not loaded on the receiving plane 214, the pulse width of the DLDS equals to the width of the elongated hole 211, and if the first disk 231 is loaded on the receiving plane 214, the pulse width of the DLDS equals to the diameter of the center hole 234 of the first disk 231.

If the light beam scans through the receiving plane 215 onto which a second disk 232 is to be loaded, the photo sensor 270 generates a second pulse signal shown in FIG. 5B. The second pulse signal includes a start and an end codes, two second identification signals(ID2) and a DLDS, wherein the pulse width of the ID2 is equal to two times that of the ID1.

While the light beam scans through the receiving plane 216 onto which a third disk 233 is to be loaded, the photo sensor 270 generates a third pulse signal shown in FIG. 5C. The third pulse signal includes a start/end codes, two third identification signals(ID3) and a DLDS, wherein the pulse width of the ID3 is equal to three times that of the ID1. The dotted lines shown in FIGS. 5A to 5C represent the DLDSs when the disks 231 to 233 are not loaded on the receiving planes 214 to 216.

In comparison with the prior art disk changer 100, the inventive disk changer 200 further includes a function for detecting whether a disk is loaded on a specific receiving plane of the round roulette 210 or not. This is achieved by forming the three sets 281 to 283 of identification throughholes and the three sets 284 of start/stop throughholes in the round roulette 210 on the circular path which passes through the centers of the center holes, thereby allowing the disk changer 200 to detect both of the identification signal and the disk loading detection signal by using a photo sensor 270.

While the present invention has been described with respect to the preferred embodiments, other modifications and variations may be made without departing from the spirit and scope of the present invention as set forth in the following claims.

What is claimed is:

1. A disk changer comprising:

a tray;

a rotatable roulette mounted on the tray and provided with N number of receiving planes, each of the receiving planes for loading a disk thereon having an elongated hole and being assigned an identification number, and each disk including a center hole, wherein N number of throughhole sets are formed in a predetermined pattern on the roulette along a circular path passing through the center hole of said each disk for sensing the identification number and a stop position of the roulette, and each elongated hole and the center hole of said each disk are utilized for sensing a disk loading detection signal, N being a positive integer;

a light source positioned above the circular path for generating a light beam; and a photo sensor mounted on the tray below the circular path for detecting a change of the light beam emitted from the light source while the roulette rotates, thereby allowing the identification number, the disk stopping position and the disk loading detection signal to be sensed by the photo sensor.

2. The disk changer of claim 1, wherein the circular path passes through a center of the center hole of said each disk.

3. The disk changer of claim 2, wherein while the roulette rotates, if a disk is not loaded on a receiving plane, the photo sensor outputs between the identification number signals a disk loading detection signal whose width is equal to that of the elongated hole, and if a disk is loaded on the receiving plane, the photo sensor outputs between the identification number signals a disk loading detection signal whose width is identical to a diameter of the center hole of the disk.

4. The disk changer of claim 1, wherein the throughholes in each throughhole set extend from an upper surface to a lower surface of the roulette.

5. The disk changer of claim 1, wherein each of the throughhole sets includes a pair of identification throughholes and four start/stop throughholes.

6. The disk changer of claim 5, wherein the length of the Nth identification throughhole is equal to N times the first identification throughhole.

7. The disk changer of claim 6, wherein the start/stop throughhloles are formed between the identification throughholes.

8. The disk changer of claim 1, wherein the width of the elongated hole is larger than the diameter of the center hole of the disk.

9. The disk changer of claim 1, further comprising a holder chuck, coupled to a circumferential surface of the tray, having a horizontal member and a fixing member for holding the disks.

10. The disk changer of claim 9, wherein the light source is attached to a bottom surface of the horizontal member at a position corresponding to the circular path of the throughhole set of the roulette.

11. The disk changer of claim 10, wherein the light beam is aligned along a line which connects the light source to the photo sensor and meets the circular path.

* * * * *